United States Patent
Soryal et al.

(10) Patent No.: US 10,791,023 B2
(45) Date of Patent: Sep. 29, 2020

(54) SYSTEM AND METHOD FOR ACTIVATING A NETWORK NODE

(71) Applicant: AT&T Intellectual Property I, L.P., Atlanta, GA (US)

(72) Inventors: Joseph Soryal, Ridgewood, NY (US); Naila Jaoude, Eatontown, NJ (US); Cristina Serban, Middletown, NJ (US); Lalita Rao, Holmdel, NJ (US); Tony Hansen, South Amboy, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 83 days.

(21) Appl. No.: 16/059,509

(22) Filed: Aug. 9, 2018

(65) Prior Publication Data

US 2020/0052961 A1 Feb. 13, 2020

(51) Int. Cl.
*G06F 15/177* (2006.01)
*H04L 12/24* (2006.01)
*G06F 9/455* (2018.01)

(52) U.S. Cl.
CPC ...... *H04L 41/0806* (2013.01); *G06F 9/45558* (2013.01); *H04L 41/0813* (2013.01); *H04L 41/0873* (2013.01); *H04L 41/0893* (2013.01); *H04L 41/30* (2013.01); *G06F 2009/45575* (2013.01)

(58) Field of Classification Search
CPC ...... H04L 67/1095; H04L 63/00; H04L 63/14
See application file for complete search history.

(56) References Cited

U.S. PATENT DOCUMENTS

| | | | |
|---|---|---|---|
| 9,531,617 B2 | 12/2016 | Karame | |
| 9,960,975 B1* | 5/2018 | Van Horenbeeck | H04L 63/1416 |
| 9,967,334 B2 | 5/2018 | Ford | |
| 2017/0091397 A1 | 3/2017 | Shah | |
| 2017/0180211 A1 | 6/2017 | Johnson | |
| 2017/0214694 A1 | 7/2017 | Yan | |
| 2017/0289152 A1* | 10/2017 | Bursell | H04L 63/0876 |
| 2017/0337534 A1 | 11/2017 | Goeringer et al. | |
| 2018/0089436 A1 | 3/2018 | Smith et al. | |
| 2018/0096121 A1 | 4/2018 | Goeringer et al. | |
| 2018/0109541 A1 | 4/2018 | Gleichauf | |
| 2018/0137306 A1 | 5/2018 | Brady et al. | |
| 2018/0139278 A1 | 5/2018 | Bathen et al. | |

* cited by examiner

*Primary Examiner* — Yves Dalencourt
(74) *Attorney, Agent, or Firm* — Baker Botts, LP (57) ABSTRACT

In one embodiment, a method includes transmitting, by a node of a network, a first configuration file to a plurality of active nodes of the network and receiving, by the node of the network, a vote from one or more of the plurality of active nodes of the network. Each vote is generated by an active node in response to the active node comparing the first configuration file received from the node to a second configuration file received from a system administrator. The method also includes determining, based on each vote received from each active node, a percentage of the plurality of active nodes of the network that voted to approve the first configuration file. The method further includes determining, by the node of the network, whether to activate the node based on the percentage of the plurality of active nodes that voted to approve the first configuration file.

17 Claims, 6 Drawing Sheets

SYSTEM AND METHOD FOR ACTIVATING A NETWORK NODE

TECHNICAL FIELD

This disclosure generally relates to network nodes, and more specifically to a system and method for activating a network node.

BACKGROUND

Virtualized environments such as software-defined networks are emerging technologies that aim to improve network performance. As these virtualized environments gain prominence, they become more susceptible to security attacks. For example, a malicious entity may manipulate one or more components of the virtualized environment to gain unauthorized access to data.

SUMMARY

According to an embodiment, a method includes transmitting, by a node of a network, a first configuration file to a plurality of active nodes of the network and receiving, by the node of the network, a vote from one or more of the plurality of active nodes of the network. Each vote is generated by an active node in response to the active node comparing the first configuration file received from the node to a second configuration file received from a system administrator. The method also includes determining, by the node of the network and based on each vote received from each active node, a percentage of the plurality of active nodes of the network that voted to approve the first configuration file. The method further includes determining, by the node of the network, whether to activate the node based on the percentage of the plurality of active nodes that voted to approve the first configuration file.

According to another embodiment, a system includes one or more processors and a memory storing instructions that, when executed by the one or more processors, cause the one or more processors to perform operations including transmitting, by a node of a network, a first configuration file to a plurality of active nodes of the network and receiving, by the node of the network, a vote from one or more of the plurality of active nodes of the network. Each vote is generated by an active node in response to the active node comparing the first configuration file received from the node to a second configuration file received from a system administrator. The operations further include determining, by the node of the network and based on each vote received from each active node, a percentage of the plurality of active nodes of the network that voted to approve the first configuration file. The operations further include determining, by the node of the network, whether to activate the node based on the percentage of the plurality of active nodes that voted to approve the first configuration file, According to yet another embodiment, one or more computer-readable storage media embody instructions that, when executed by a processor, cause the processor to perform operations including transmitting, by a node of a network, a first configuration file to a plurality of active nodes of the network and receiving, by the node of the network, a vote from one or more of the plurality of active nodes of the network. Each vote is generated by an active node in response to the active node comparing the first configuration file received from the node to a second configuration file received from a system administrator. The operations further include determining, by the node of the network and based on each vote received from each active node, a percentage of the plurality of active nodes of the network that voted to approve the first configuration file. The operations further include determining, by the node of the network, whether to activate the node based on the percentage of the plurality of active nodes that voted to approve the first configuration file.

Technical advantages of this disclosure may include one or more of the following. Determining to activate a newly created node utilizing a voting method may eliminate a single point of failure if a controller of a network is compromised. Using blockchain with virtualized environments in accordance with this disclosure may trace and log events such that they cannot be altered by a malicious entity or individual. This disclosure offers a non-intrusive security checkpoint to create new nodes (e.g., virtual machines and software defined elements). Additionally, this disclosure provides multiple layers of highly secure verification mechanisms to ensure that security configurations used to create network nodes are not tampered with or maliciously compromised. The system of this disclosure is highly configurable and vendor, hardware, and/or operating system neutral such that it may be used with any virtual environment.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

In networks such as a software-defined network (SDN), a controller (e.g., an SDN controller) is responsible for creating nodes (e.g., software-defined elements) in accordance with certain configuration files. For example, a network controller, such as a network orchestrator, may be responsible for creating new virtual machines in accordance with a configuration file received from a system administrator. Malicious entities may alter the configuration files used to create the network nodes, which may result in an attack on the network. For example, a malicious actor may alter a configuration file in the network controller to create a virtual machine in the network that duplicates data packets transmitted within the network and forwards the duplicated data packets to the malicious actor's Internet Protocol (IP) address, granting the malicious actor access to unauthorized information. Intrusive security tools may be installed on a created node to authenticate the configuration file, but these tools may interfere with the operation of the created node. Embodiments of this disclosure provide a secure verification mechanism that determines whether to activate network nodes, which may prevent the activation of network nodes that have been maliciously compromised.

Figure 1:
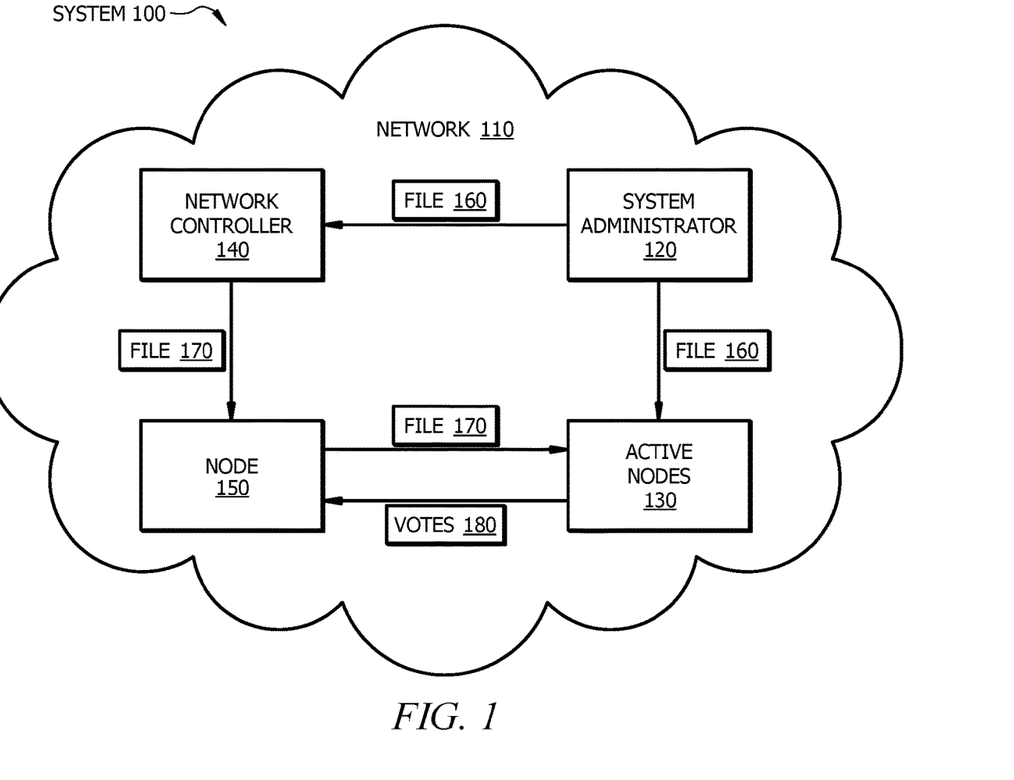
FIG. 1 illustrates an example system for determining whether to activate a node of a network.
Figure 2:
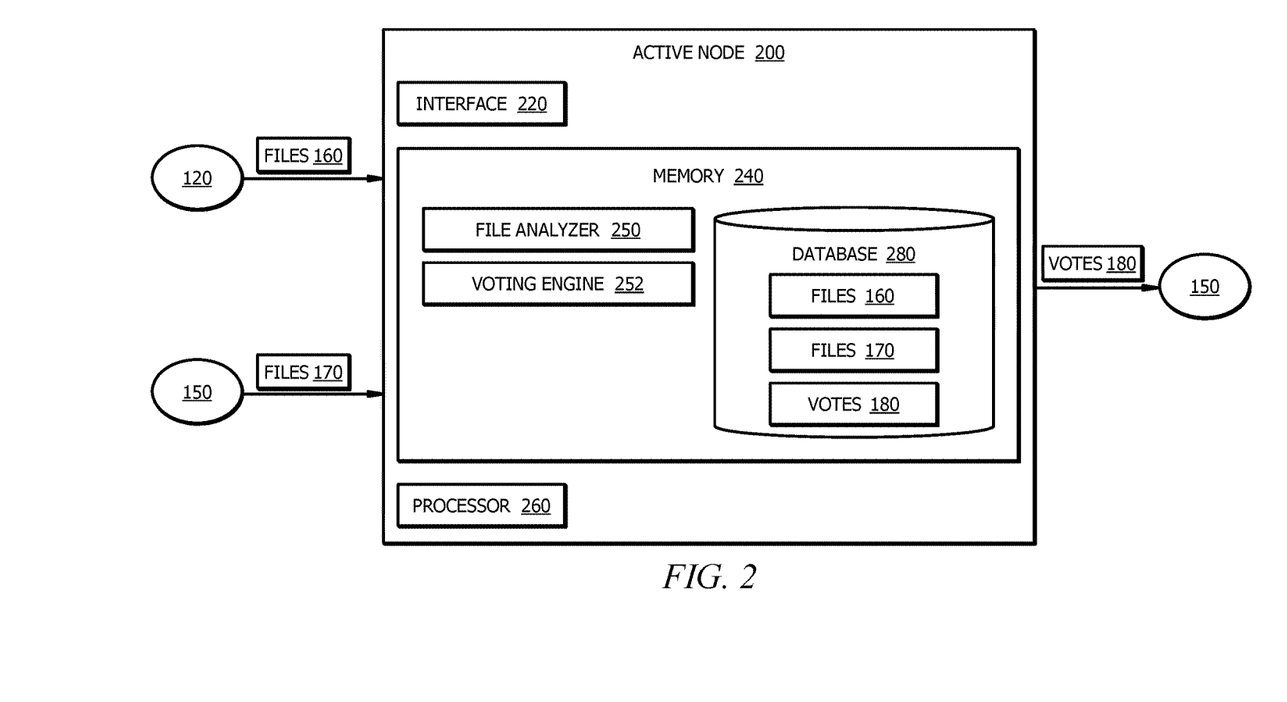
FIG. 2 illustrates an example active node that may be used by the system of FIG. 1.
Figure 3:
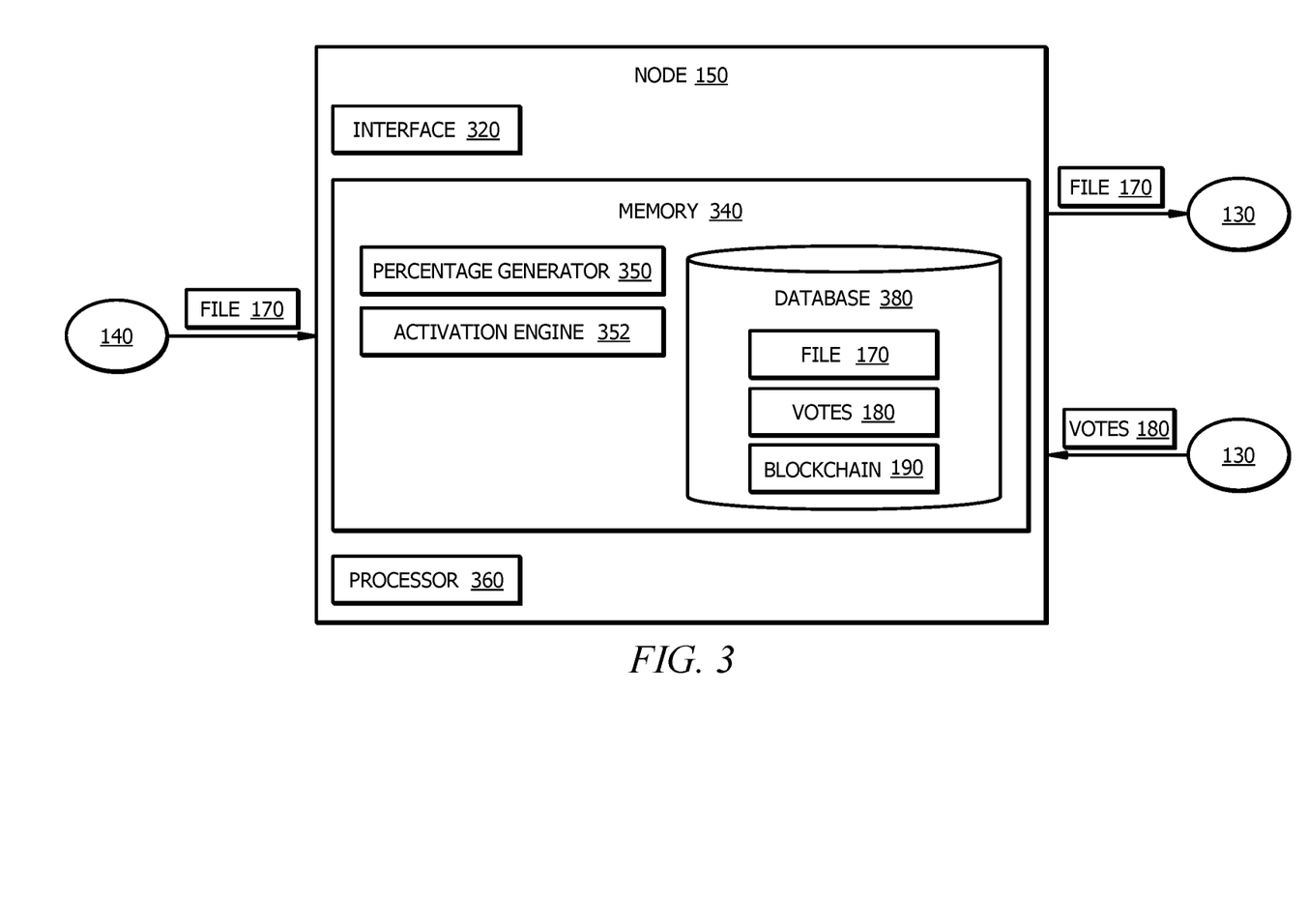
FIG. 3 illustrates an example network node that may be used by the system of FIG. 1.
Figure 4:
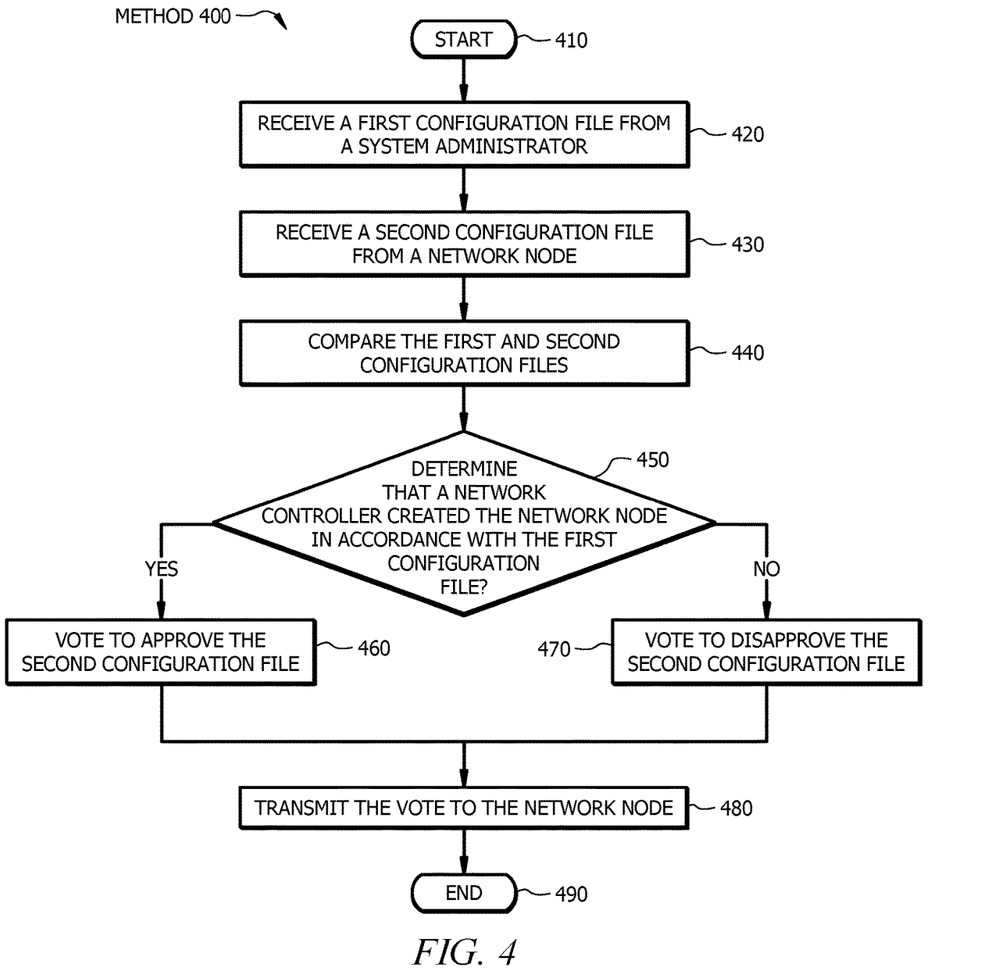
FIG. 4 illustrates an example method for voting to approve or disapprove a configuration file.
Figure 5:
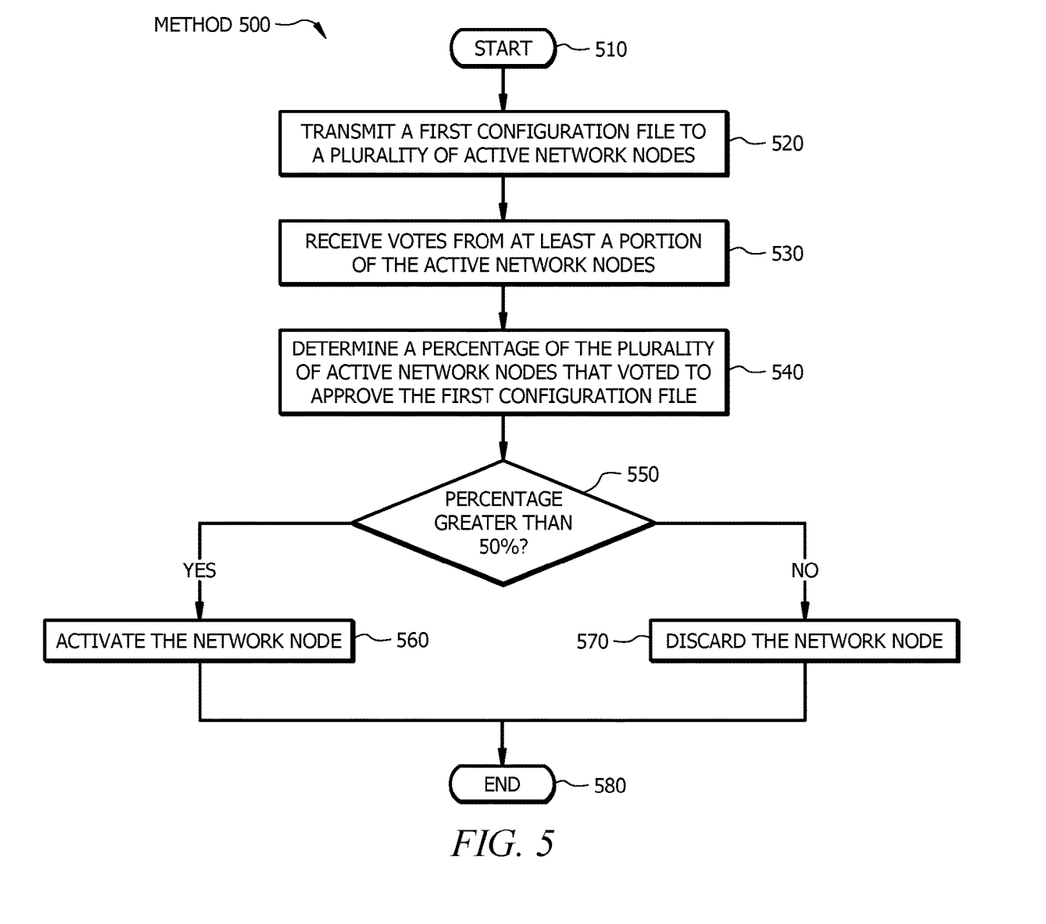
FIG. 5 illustrates an example method for activating or discarding a network node.
Figure 6:
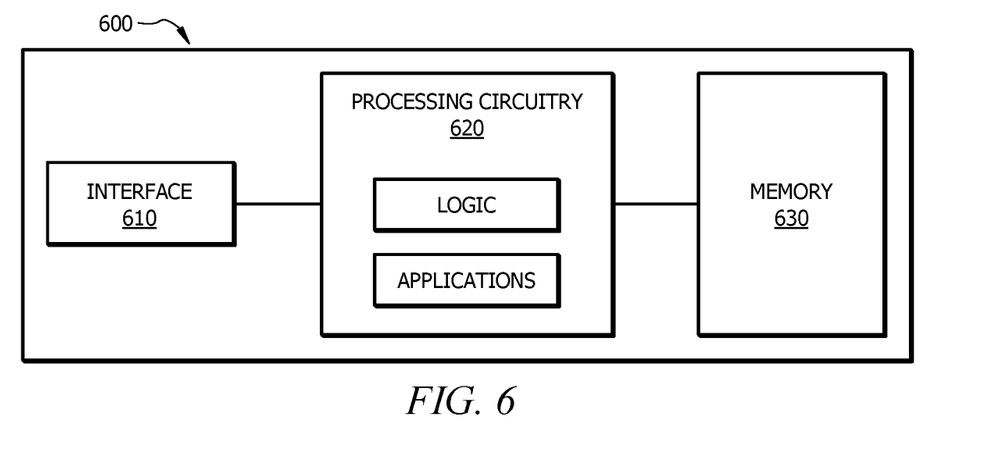
FIG. 6 illustrates an example computer system that may be used by the systems and methods described herein.

FIGS. 1 through 6 show example systems and methods for determining whether to activate nodes of a network. FIG. 1 shows an example system for determining whether to activate a node of a network. FIG. 2 shows an example active node that may be used by the system of FIG. 1 and FIG. 3 shows an example network node that may be used by the system of FIG. 1. FIG. 4 shows an example method for voting to approve or disapprove a configuration file and FIG. 5 shows an example method for activating or discarding a node of the network. FIG. 6 shows an example computer system that may be used by the systems and methods described herein.

FIG. 1 illustrates an example system 100 for determining whether to activate a node of a network. System 100 of FIG. 1 includes a network 110, a system administrator 120, one or more active nodes 130, a network controller 140, and node 150. One or more components of system 100 may have machine learning capabilities. System 100 or portions thereof may be associated with an entity, which may include any entity, such as a business or company, that determines whether to activate a node of a network. The elements of system 100 may be implemented using any suitable combination of hardware, firmware, and software.

Network 110 may be any type of network that facilitates communication between components of system 100. Network 110 may connect system administrator 120, active nodes 130, network controller 140, and node 150 of system 100. Although this disclosure shows network 110 as being a particular kind of network, this disclosure contemplates any suitable network. Network 110 may be a cloud-based virtual environment. Network 110 may be an SDN. One or more portions of network 110 may include SDN technology. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. For example, node 150 of system 100 may communicate over network 110, including receiving information from network controller 140 and active nodes 130 and transmitting information to active nodes 130.

System administrator 120 represents a human, machine, or a combination thereof that makes decisions for network 110. System administrator 120 may generate rules that are used to create one or more nodes of network 110. For example, system administrator 120 may generate a unique set of rules that may be used to create node 150. The unique set of rules associated with node 150 may be represented by configuration file 160.

Configuration file 160 is a file that is generated for use in configuring the parameters and initial settings for node 150. Configuration file 160 of node 150 may represent a number of opened ports, permitted traffic directions, permitted protocols, access privileges, versions of security patches, operating system information, packet types and lengths, and/or static routing tables of node 150. Configuration file 160 may be input to a hash function to generate a hash. Configuration file 160 may be represented by the hash. Configuration file 160 may be stored in a blockchain. System administrator 120 may transmit configuration file 160 (e.g., a hash) to active nodes 130 and network controller 140.

System administrator 120 may receive alerts from one or more components of system 100 indicating that one or more components of system 100 have been potentially compromised. For example, system administrator 120 may receive an alert from node 150 of system 100 indicating that network controller 140 has been potentially compromised. System administrator 120 may receive an automated email generated by node 150 before, while, or after node 150 determines to discard itself. The email may inform system administrator 120 that configuration file 160 has been altered. System administrator 120 may determine whether the alteration to configuration file 160 is malicious. Based on this determination, system administrator 120 may transmit an alert to node 150 either approving or denying the removal of node 150 from network 110. For example, system administrator 120 may determine that the alteration to configuration file 160 was performed by a malicious actor and transmit an alert to node 150 that approves node 150 discarding itself from network 110. As another example, system administrator 120 may determine that the alteration to configuration file 160 is justified based on one or more modifications made by system administrator 120 to configuration file 160 and transmit an alert to node 150 that prevents node 150 from discarding itself from network 110.

Active nodes 130 represent nodes of network 110 that are in operation. Active nodes 130 perform operations in accordance with their respective configuration files. Active nodes 130 communicate with each other. For example, a first active node 130 of network 110 may forward data packets to a second active node 130 of network 110 in accordance with the traffic configurations permitted by the configuration file of first active node 130. Each active node 130 receives configuration file 160, which is generated for use in configuring the parameters and initial settings for node 150, from system administrator 120.

Each active node 130 receives configuration file 170 from node 150 to verify the authenticity of node 150. Configuration file 170 is used by network controller 140 to create node 150. Configuration file 170 received by active nodes 130 from node 150 and configuration file 160 received by active nodes 130 from system administrator 120 are the same file unless configuration file 160 is altered within network controller 140. For example, a malicious actor may alter configuration file 160 within network controller 140 to create altered configuration file 170, network controller 140 may use altered configuration file 170 to create node 150, and active nodes 130 may receive altered configuration file 170 from node 150. One or more active nodes 130 compare configuration file 160 received from system administrator 120 to configuration file 170 received from node 150. Based on the comparison, each active node 130 determines whether network controller 120 created node 150 in accordance with configuration file 160 received from system administrator 120.

One or more active nodes 130 may determine that network controller 120 created node 150 in accordance with configuration file 160 if configuration file 160 is identical or substantially identical to configuration file 170. One or more active nodes 130 may determine that network controller 120 created node 150 in accordance with configuration file 160 if configuration file 160 and configuration file 170 share certain characteristics. For example, one or more active nodes 130 may determine that network controller 120 created node 150 in accordance with configuration file 160 if one or more rules embedded in configuration file 160 are also embedded in configuration file 170.

One or more active nodes 130 may determine that network controller 120 did not create node 150 in accordance with configuration file 160 if configuration file 160 is different than configuration file 170. One or more active nodes 130 may determine that network controller 120 did not create node 150 in accordance with configuration file 160 if configuration file 160 and configuration file 170 do not share certain characteristics. For example, one or more active nodes 130 may determine that network controller 120 did not create node 150 in accordance with configuration file 160 if one or more rules embedded in configuration file 170 are not embedded in configuration file 160.

In the event one or more active nodes 130 determine that network controller 120 created node 150 in accordance with configuration file 160, each active node 130 may generate a vote 180 to approve configuration file 170 received from node 150. Each active node 130 may transmit approval vote 180 to node 150. In the event one or more active nodes 130 determine that network controller 120 did not create node 150 in accordance with configuration file 160, each active node 130 may generate vote 180 to disapprove configuration file 170 received from node 150. Active node 130 may transmit disapproval vote 180 to node 150. An example of an active node is described in more detail in FIG. 2 below.

Network controller 140 of system 100 represents a controller node of network 110 that controls one or more behaviors of network 110. Network controller 140 may be an SDN controller that automatically programs the behavior of an SDN network. For example, network controller 140 may be a centralized software-based controller that instructs subordinate nodes (e.g., active nodes 130) on how to forward network traffic. Network controller 140 may create one or more subordinate nodes (e.g., virtual machines) of network 110.

Network controller 140 receives configuration file 160 from system administrator 120. Network controller 140 creates node 150 in accordance with configuration file 170. In the event configuration file 160 that network controller 140 received from system administrator 120 has not been altered within network controller 140, configuration file 170 represents configuration file 160. In the event configuration file 160 received from system administrator 120 has been altered within network controller 140, configuration file 170 represents the altered version of configuration file 160. Configuration file 160 may be altered within network controller 140 due to malicious activity. For example, a malicious actor may alter configuration file 160 such that altered configuration file 170 includes rules that forward data packets to the malicious actor's IP address.

Network controller 140 may store configuration files for each type of node that may be generated by network controller 140. For example, network controller 140 may include a database that stores a configuration file for each of a certain number of potential network nodes, including node 150, for network 110. Network controller 140 may receive the configuration files for each type of node from system administrator 120. In the illustrated embodiment, network controller 140 creates node 150 using configuration file 170.

Node 150 of system 100 represents a node of network 110 that is created by network controller 140 in accordance with configuration file 170. Node 150 may be a virtual machine, a software-defined element, a router, a server (e.g., an application server), a firewall, or a switch. Node 150 transmits configuration file 170 to active nodes 130 of network 110, and active nodes 130 may represent all active nodes of network 110. Node 150 of network 110 is not fully activated upon its creation. For example, communication between node 150 and active nodes 130 of network 110 may be limited to transmitting configuration file 170 to active nodes 130 and receiving votes 180 from one or more active nodes 130. Node 150 of network 150 may become fully active based on votes 180 received from active nodes 130. Node 150 may store a blockchain that traces and logs events occurring within node 150 such that the record of events cannot be altered by a malicious entity or individual. For example, node 150 may store a blockchain that includes configuration file 170 received from network controller 140 and/or all votes 180 received from active nodes 130.

Node 150 may determine, based on votes 180 received from active nodes 130 of network 110, a percentage of active nodes 130 of network 110 that voted to approve configuration file 170 used by network controller 140 to create node 150. In the event the percentage of active nodes 130 that voted to approve configuration file 170 is greater than a predetermined threshold, node 150 may activate itself. The predetermined threshold may be fifty percent for networks associated with entities that have average security requirements (e.g., a video gaming company). The predetermined threshold may be greater than fifty percent for networks associated with entities that have heightened security requirements. For example, system 100 may require that the percentage of active nodes 130 that voted to approve configuration file 170 equal 100 percent when network 110 is associated with the Department of Homeland Security. Node 150 may activate itself when the percentage of active nodes 130 that voted to approve configuration file 170 surpasses the predetermined threshold. Node 150 may activate itself when the percentage of active nodes 130 that voted to approve configuration file 170 equals the predetermined threshold Node 150 may determine, based on votes 180 received from active nodes 130 of network 110, a percentage of active nodes 130 of network 110 that voted to disapprove configuration file 170 used by network controller 140 to create node 150. In the event the percentage of active nodes 130 that voted to disapprove configuration file 170 is greater than a predetermined threshold, node 150 may discard itself. Discarding node 150 from network 110 removes all connections between node 150 and active nodes 130 of network 110. A discarded node is unable to communicate with active nodes 130 of network 110. Node 150 may discard itself when the percentage of active nodes 130 that voted to disapprove configuration file 170 surpasses the predetermined threshold. Before, while, or after node 150 discards itself, node 150 may transmit an alert to system administrator 120 to inform system administrator 120 that configuration file 160 has been altered.

Node 150 may calculate the percentage of active nodes 130 of network 110 that voted to approve or disapprove configuration file 170 after a predetermined amount of time. For example, node 150 may calculate the percentage after a predetermined amount of time lapses after node 150 transmits configuration file 170 to active nodes 130. The predetermined amount of time may be determined by system administrator 120 and may vary depending on one or more factors (e.g., the security requirements of an entity associated with network 110, the speed of network 110, and so on.) Node 150 is described in more detail in FIG. 3 below.

Although FIG. 1 illustrates a particular arrangement of network 110, system administrator 120, active nodes 130, network controller 140, and node 150, this disclosure contemplates any suitable arrangement of network 110, system administrator 120, active nodes 130, network controller 140, and node 150. Two or more of system administrator 120, active nodes 130, network controller 140, and node 150 may be connected to each other directly, bypassing network 110. Two or more of system administrator 120, active nodes 130, network controller 140, and node 150 may be physically or logically co-located with each other in whole or in part. Although FIG. 1 illustrates a particular number of networks 110, system administrators 120, active nodes 130, network controllers 140, and nodes 150, this disclosure contemplates any suitable number of networks 110, system administrators 120, active nodes 130, network controllers 140, and nodes 150. For example, network 110 may include multiple network controllers 140 (e.g., a master network controller and a sub-master network controller).

In operation, system administrator 120 transmits configuration file 160 to network controller 140 and active nodes 130 of network 110. Configuration file 160 represents a file that is generated for use in configuring the parameters and initial settings for node 150. Network controller 140 creates node 150 of network 110 using configuration file 170. Configuration file 170 represents the file used by network controller 140 to configure the parameters and initial settings for node 150. Node 150 transmits configuration file 170 to active nodes 130. Active nodes 130 compare configuration file 160 received from system administrator 120 to configuration file 170 received from node 150. Based on the comparison, one or more active nodes 130 determine whether network controller 140 created node 150 in accordance with configuration file 160. Based on this determination, active nodes 130 generate votes 180 to approve and/or disapprove configuration file 170. For example, an active node may vote to approve configuration file 170 in the event configuration file 170 is identical to configuration file 160. As another example, an active node may vote to disapprove configuration file 170 in the event configuration file is different than configuration file 160. Active nodes 130 transmit approval and/or disapproval votes 180 to node 150. Node 150 determines a percentage of active nodes 130 of network 110 that voted to approve configuration file 160. Node 150 determines whether to activate node 150 based on the percentage of active nodes 130 of network 110 that voted to approve configuration file 160. In the event the percentage of active nodes 130 of network 110 that voted to approve configuration file 160 is greater than a predetermined threshold (e.g., fifty percent), node 150 activates itself, which enables node 150 to fully function in accordance with configuration file 170. In the event the percentage of active nodes 130 of network 110 that voted to approve configuration file 160 is less than or equal to the predetermined threshold, node 150 discards itself, which removes all connections from node 150 to active nodes 130 of network 110.

As such, system 100 of FIG. 1 provides a secure verification mechanism that determines whether to activate a newly created node of a network, which may prevent the activation of nodes that have been maliciously compromised.

FIG. 2 illustrates an example active node 200 that may be used by the system of FIG. 1. Active node 200 may be an active node of active nodes 130 of FIG. 1. Active node 200 includes interface 220, memory 240, and processor 260. Memory 240 includes file analyzer 250, voting engine 252, and database 280. Database 280 includes configuration files 160, configuration files 170, and votes 180.

Interface 220 of active node 200 represents any suitable computer element that can receive information from network 110, transmit information through network 110, perform suitable processing of the information, communicate to other components (e.g., system administrator 120, network controller 140 and node 150) of system 100, or any combination of the preceding. Interface 220 may receive one or more configuration files 160 from system administrator 120 via network 110 of FIG. 1, for example. Interface 220 may receive one or more configuration files 170 from one or more nodes 150 of FIG. 1 and transmit one or more votes 180 to one or more nodes 150, as another example. Interface 220 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 240 of active node 200 stores, permanently and/or temporarily, received and transmitted information, as well as system software, control software, other software for active node 200, and a variety of other information. Memory 240 may store information for execution by processor 260. Memory 240 stores file analyzer 250, voting engine 252, and database 280. Memory 240 includes any one or a combination of volatile or non-volatile local or remote devices suitable for storing information. Memory 240 may include Random Access Memory (RAM), Read-only Memory (ROM), magnetic storage devices, optical storage devices, or any other suitable information storage device or a combination of these devices. Memory 240 may include any suitable information for use in the operation of active node 200. Additionally, memory 240 may be a component external to (or may be partially external to) active node 200. Memory 240 may be located at any location suitable for memory 240 to communicate with active node 200.

Processor 260 of active node 200 controls certain operations of active node 200 by processing information received from interface 220 and memory 240 or otherwise accessed by processor 260. Processor 260 communicatively couples to interface 220 and memory 240. Processor 260 may include any hardware and/or software that operates to control and process information. Processor 260 may be a programmable logic device, a microcontroller, a microprocessor, any suitable processing device, or any suitable combination of the preceding. Additionally, processor 260 may be a component external to active node 200. Processor 260 may be located in any location suitable for processor 260 to communicate with active node 200. Processor 260 controls the operation of file analyzer 250 and voting engine 252.

File analyzer 250 of active node 200 is a computer program that analyzes configuration files. Active node 200 receives configuration file 160 from system administrator 120 and configuration file 170 from node 150, and file analyzer 250 compares configuration file 160 to configuration file 170 to determine whether configuration file 160 has been altered. File analyzer 250 may use instructions received from system administrator 120 to determine whether configuration file 160 has been altered. The instructions from system administrator 120 may instruct active node 200 to compare configuration 160 in its entirety to configuration file 170 in its entirety. For example, file analyzer 250 may use instructions received from system administrator 120 to determine whether configuration file 160 and configuration file 170 are identical.

The instructions received by active node 200 from system administrator 120 may instruct active node 200 to only compare certain parameters or settings of configuration 160 in to certain parameters or settings of configuration file 170. For example, file analyzer 250 may only compare a parameter of configuration files 160 and 170 that specifies a permitted number of opened ports. File analyzer 250 transmits the analysis of configuration files 160 and 170 to voting engine 252. File analyzer 250 may transmit the analysis generated from analyzing configuration file 160 and/or configuration file 170 to voting engine 252.

File analyzer 250 of active node 200 may have machine learning capabilities. File analyzer 250 may query an entity that utilizes network 110 to determine the entity's requirements for configuration files. For example, file analyzer 250 may determine, based on querying the entity, that the entity does not allow a particular extension (e.g., .exe) in the traffic of network 110 and check configuration file 170 for that particular extension. As another example, file analyzer 250 may determine, based on querying the entity, that the entity requires a particular protocol and check configuration file 170 for that particular protocol. File analyzer 250 may generate an alarm (e.g., a flag) if configuration file 170 does not comply with the entity's configuration file requirements. File analyzer 250 may transmit the query analysis to activation engine 352 of node 150.

Voting engine 252 of active node 200 is a computer program that determines whether to approve and/or disapprove one or more configuration files. Voting engine 252 receives the analysis of configuration files 160 and 170 performed by file analyzer 250 and determines, based on the analysis, whether to approve configuration file 170 received from node 150. The analysis received from file analyzer 250 may include the results from comparing configuration file 160 to configuration file 170. The analysis received from file analyzer 250 may include one or more indications (e.g., an indication that configuration file 170 allows an action prohibited by an entity) generated by file analyzer 250 using machine learning capabilities. Voting engine 252 may generate vote 180 based on the received analysis. Vote 180 may represent one of the following: an approval vote to approve configuration file 170, a disapproval vote to disapprove configuration file 170, or a neutral vote to neither approve nor disapprove configuration file 170.

Voting engine 252 may vote to approve configuration file 170 if the analysis received from file analyzer 250 indicates that configuration file 160 and configuration file 170 are identical. Voting engine 252 may vote to approve configuration file 170 if the analysis received from file analyzer 250 indicates that configuration file 160 and configuration file 170 share one or more parameters or settings. If voting engine 252 votes to approve configuration file 170, voting engine 252 generates vote 180 representing an approval vote and transmits approval vote 180 to node 150.

Voting engine 252 may vote to disapprove configuration file 170 if the analysis received from file analyzer 250 indicates that configuration file 160 and configuration file 170 are not identical. Voting engine 252 may vote to disapprove configuration file 170 if the analysis received from file analyzer 250 indicates that one or more parameters or settings of configuration file 160 and configuration file 170 are different. In the event the analysis received from file analyzer 250 indicates that configuration file 160 and configuration file 170 share one or more parameters or settings but one or more other parameters or settings of configuration file 160 and configuration file 170 are different, voting engine 252 may vote to disapprove configuration file 160. If voting engine 252 votes to disapprove configuration file 170, voting engine 252 generates vote 180 representing a disapproval vote and transmits disapproval vote 180 to node 150.

Voting engine 252 may vote to neither approve nor disapprove configuration file 170 if voting engine 252 determines that file analyzer 250 did not provide sufficient information for voting engine 252 to either approve or disapprove configuration file 170. Voting engine may generate vote 180 representing a neutral vote that neither approves nor disapproves configuration file 160 and transmit neutral vote 180 to node 150.

Active node 200, as illustrated in FIG. 2, may represent each active node of active nodes 130 of FIG. 1. For example, system 100 of FIG. 1 may include two or more active nodes 200. Active nodes 200 may transmit votes 180 to node 150 of FIG. 1. Node 150 may determine, based on votes 180 received from active nodes 200, whether to activate node 150, as described in FIG. 3 below.

Database 280 is any component that can store data associated with system 100. Database 280 may store certain types of information for network 110. Database 280 may be a single database or may include multiple databases. Database 280 stores configuration files 160 received from system administrator 120, configuration files 170 received from one or more nodes 150, and votes 180 generated by voting engine 252 of active node 200. Database 280 includes any one or a combination of volatile or non-volatile local or remote devices suitable for storing information. Database 280 may include RAM, ROM, magnetic storage devices, optical storage devices, or any other suitable information storage device or a combination of these devices. Although database 280 is shown separate from system administrator 120, network controller 140, and node 150 of FIG. 1, database 280 may be located in any location suitable for communication with system administrator 120, network controller 140, and node 150. Database 280 may be externally located from system 100. Database 280 may be located in system administrator 120, network controller 140, and/or node 150. Although described as a database, database 280 may be implemented as any suitable type of volatile or non-volatile memory. Database 280 may include one or more interfaces and/or processors.

FIG. 3 illustrates an example node 150 that may be used by the system of FIG. 1. Node 150 includes interface 320, memory 340, and processor 360. Memory 340 includes percentage generator 350, activation engine 352, and database 380. Database 380 includes configuration file 170, votes 180, and blockchain 190.

Interface 320 of node 150 represents any suitable computer element that can receive information from network 110, transmit information through network 110, perform suitable processing of the information, communicate to other components (e.g., system administrator 120, active nodes 130, and network controller 140) of system 100, or any combination of the preceding. Interface 320 may transmit configuration file 170 of FIG. 1 to active nodes 130 of via network 110, for example. Interface 320 may receive votes 180 of FIG. 1 from active nodes 130, as another example. Interface 320 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 340 of node 150 stores, permanently and/or temporarily, received and transmitted information, as well as system software, control software, other software for node 150, and a variety of other information. Memory 340 may store information for execution by processor 360. Memory 340 stores percentage generator 350, activation engine 352, and database 380. Memory 340 includes any one or a combination of volatile or non-volatile local or remote devices suitable for storing information. Memory 340 may include RAM, ROM, magnetic storage devices, optical storage devices, or any other suitable information storage device or a combination of these devices. Memory 340 may include any suitable information for use in the operation of node 150. Additionally, memory 340 may be a component external to (or may be partially external to) node 150. Memory 340 may be located at any location suitable for memory 340 to communicate with node 150.

Processor 360 of node 150 controls certain operations of node 150 by processing information received from interface 320 and memory 340 or otherwise accessed by processor 360. Processor 360 communicatively couples to interface 320 and memory 340. Processor 360 may include any hardware and/or software that operates to control and process information. Processor 360 may be a programmable logic device, a microcontroller, a microprocessor, any suitable processing device, or any suitable combination of the preceding. Additionally, processor 360 may be a component external to node 150. Processor 360 may be located in any location suitable for processor 360 to communicate with node 150. Processor 360 controls the operation of percentage generator 350 and activation engine 352.

Percentage generator 350 of node 150 is a computer program that determines a percentage of active nodes 130 that voted to approve and/or disapprove configuration file 170. Configuration file 170 is the file used by network controller 140 to create node 150. Node 150 receives votes 180 from one or more active nodes 130 of network 110. Each vote 180 may represent whether an active node of active nodes 130 approves or disapproves configuration file 170. Based on votes 180 received from active nodes 130, percentage generator 350 determines a percentage of active nodes 130 of network 110 that voted to approve and/or disapprove configuration file 170. Percentage generator 350 may disregard neutral votes 180 that neither approve nor disapprove configuration file 160 when determining the percentage.

Percentage generator 350 may consider votes 180 received from all or a portion of active nodes 130 of network 110. Percentage generator 350 may determine that fifty-one percent of active nodes 130 of network 110 approve configuration file 170 upon receiving approval votes 180 from fifty-one percent of all active nodes 130 of network 110. Percentage generator 350 may determine that 100 percent of active nodes 130 of network 110 approve configuration file 170 upon receiving approval votes 180 from 100 percent of all active nodes 130 of network 110. Percentage generator 350 may determine that a certain percentage of active nodes 130 of network 110 approve configuration file 170 upon receiving approval votes 180 from that percentage of a portion of active nodes 130 in network 110.

Percentage generator 350 may determine that fifty-one percent of active nodes 130 of network 110 disapprove configuration file 170 upon receiving disapproval votes 180 from fifty-one percent of all active nodes 130 of network 110. Percentage generator 350 may determine that at 100 percent of active nodes 130 of network 110 disapprove configuration file 170 upon receiving approval votes 180 from all 100 percent of active nodes 130 of network 110. Percentage generator 350 may determine that a certain percentage of active nodes 130 of network 110 disapprove configuration file 170 upon receiving disapproval votes 180 from that percentage of a portion of active nodes 130 of network 110. Percentage generator 350 may only consider votes 180 received within a predetermined amount of time.

Activation engine 352 of node 150 is a computer program that determines whether to activate node 150. Activation engine 352 may determine whether to activate node 150 based on the percentage calculated by percentage generator 350 of active nodes 130 that voted to approve and/or disapprove configuration file 170. Activation engine 352 may determine to activate node 150 if the percentage of active nodes 130 that voted to approve configuration file 170 is greater than a predetermined threshold (e.g., greater than fifty percent or equal to 100 percent).

Activation engine 352 may determine not to activate node 150 if the percentage of active nodes 130 that voted to approve configuration file 170 is less than a predetermined threshold (e.g., less than fifty percent or less than 100 percent). Activation engine 352 may determine not to activate node 150 if the percentage of active nodes 130 that voted to disapprove configuration file 170 is greater than a predetermined threshold (e.g., greater than fifty percent). If activation engine 352 determines not to activate node 150, activation engine 352 may determine to discard node 150 from network 110. Discarding node 150 from network 110 shuts down communication (e.g., routing of traffic) between node 150 and one or more components of system 100 (e.g., active nodes 130).

Activation engine 352 of node 150 may perform one or more security checks prior to activating or discarding node 150. For example, in the event activation engine 352 determines to discard node 150 from network 110, activation engine 352 may transmit an alert to system administrator 120. Activation engine 352 may not discard node 150 unless activation engine 352 receives an approval from system administrator 120 to discard node 150. As another example, activation engine 352 may receive an analysis from querying an entity that utilizes network 110 from file analyzer 250 of active node 200. If the analysis indicates that configuration file 170 does not comply with the entity's configuration file requirements, activation engine 352 may transmit an alert to system administrator 120 and await approval from system administrator 120 prior to activating node 150.

Database 380 is any component that can store data associated with system 100. Database 380 may store certain types of information for network 110. Database 380 may be a single database or may include multiple databases. Database 380 stores configuration file 170 used to create node 150, votes 180 received from active nodes 130 of FIG. 1, and blockchain 190. Blockchain 190 is a dynamic list of blocks that are linked using cryptography. Blockchain 190 includes transactions between node 150 and other components (e.g., active nodes 130) of network 110. Blockchain 190 contains a cryptographic hash of the previous block, a timestamp, and transaction data (e.g., transactions between node 150 and other components of system 100). Blockchain 190 is unalterable. Blockchain 190 may trace and log events (e.g., configuration files 170 and votes 180 received by node 150) such that they cannot be altered by a malicious entity or individual.

Database 380 includes any one or a combination of volatile or non-volatile local or remote devices suitable for storing information. Database 380 may include RAM, ROM, magnetic storage devices, optical storage devices, or any other suitable information storage device or a combination of these devices. Although database 380 is shown separate from system administrator 120, active nodes 130, and network controller 140 of FIG. 1, database 380 may be located in any location suitable for communication with system administrator 120, active nodes 130, and network controller 140. Database 380 may be externally located from system 100. Database 380 may be located in system administrator 120, one or more active nodes 130, and/or network controller 140. Although described as a database, database 380 may be implemented as any suitable type of volatile or non-volatile memory. Database 380 may include one or more interfaces and/or processors.

FIG. 4 shows an example method for voting to approve or disapprove a configuration file. Method 400 begins at step 410. At step 420, an active node of a network (e.g., active node 200 of FIG. 2) receives a first configuration file (e.g., configuration file 160 of FIG. 1) from a system administrator (e.g., system administrator 120 of FIG. 1). The first configuration file may be a configuration file generated by the system administrator and transmitted to a network controller (e.g., network controller 140 of FIG. 1) of the network for the purpose of creating a node (e.g., node 150 of FIG. 1) for the network. At step 430, the active node receives a second configuration file (e.g., configuration file 170 of FIG. 1) from the network node. The second configuration file is used by the network controller to create the network node.

At step 440, the active node compares the first configuration file received from the system administrator to the second configuration file received from the network node. At step 450, based on the comparison, the active node determines whether the network controller created the network node in accordance with the first configuration file received from the system administrator. The active node may determine whether the network controller created the network node in accordance with the first configuration file by detecting similarities and/or differences between the first and second configuration files.

If the active node determines that the network controller created the network node in accordance with the first configuration file received from the system administrator, method 400 advances to step 460, where the active node votes to approve the second configuration file. If the active node determines that the network controller did not create the network node in accordance with the first configuration file received from the system administrator, method 400 advances to step 470, where the active node votes to disapprove the second configuration file. Method 400 advances from either step 460 or 470 to step 480, where the active node transmits the vote (e.g., an approval vote or a disapproval vote) to the network node. Method 400 ends at step 490.

Modifications, additions, or omissions may be made to method 400 depicted in FIG. 4. Method 400 may include more, fewer, or other steps. For example, method 400 may include steps such as the active node voting to neither approve nor disapprove the second configuration file and transmitting a neutral vote to the network node. Steps may also be performed in parallel or in any suitable order. While discussed as specific components completing the steps of method 400, any suitable component of system 100 may perform any step of method 400.

FIG. 5 shows an example method for activating or discarding a node of a network. Method 500 begins at step 510. At step 520, a network node (e.g., node 150 of FIG. 1) created by a network controller (e.g., network controller 140 of FIG. 1) transmits a first configuration file (e.g., configuration file 170 of FIG. 1) to a plurality of active nodes (e.g., active nodes 130 of FIG. 1) of the network. The first configuration file is used by the network controller to create the network node.

At step 530, the network node receives votes (e.g., votes 180 of FIG. 1) from at least a portion of the active nodes of the network. The votes may be generated by the active nodes in accordance with method 400 of FIG. 4. At step 540, the network node determines a percentage of the plurality of active network nodes that voted to approve the first configuration file. The plurality of active nodes may represent all active nodes of the network.

At step 550, the network node determines whether the percentage of the plurality of active network nodes that voted to approve the first configuration file is greater than a predetermined threshold (e.g., fifty percent). If the active node determines that the percentage of the plurality of active network nodes that voted to approve the first configuration file is greater than the predetermined threshold, method 500 advances to step 560, where the network node activates itself. If the active node determines that the percentage of the plurality of active network nodes that voted to approve the first configuration file is less than or equal to the predetermined threshold, method 500 advances to step 570, where the active node discards itself. Method 400 advances from either step 560 or 570 to step 580, where method 500 ends.

Modifications, additions, or omissions may be made to method 500 depicted in FIG. 5. Method 500 may include more, fewer, or other steps. For example, method 500 may include a step prior to step 570 (e.g., discarding the network node) that requires approval from a system administrator prior to discarding the network node. Steps may also be performed in parallel or in any suitable order. While discussed as specific components completing the steps of method 500, any suitable component of system 100 may perform any step of method 500.

FIG. 6 shows an example computer system that may be used by the systems and methods described herein. For example, any of network 110, active nodes 130, network controller 140, and network node 150 of FIG. 1 may include one or more interface(s) 610, processing circuitry 620, memory(ies) 630, and/or other suitable element(s). Interface 610 (e.g., interface 220 of FIG. 2 and interface 320 of FIG. 3) receives input, sends output, processes the input and/or output, and/or performs other suitable operation. Interface 610 may comprise hardware and/or software.

Processing circuitry 620 (e.g., processor 260 of FIG. 2 and processor 360 of FIG. 3) performs or manages the operations of the component. Processing circuitry 620 may include hardware and/or software. Examples of a processing circuitry include one or more computers, one or more microprocessors, one or more applications, etc. In certain embodiments, processing circuitry 620 executes logic (e.g., instructions) to perform actions (e.g., operations), such as generating output from input. The logic executed by processing circuitry 620 may be encoded in one or more tangible, non-transitory computer readable media (such as memory 630). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 630 (or memory unit) stores information. Memory 630 (e.g., memory 240 of FIG. 2 and memory 340 of FIG. 3) may comprise one or more non-transitory, tangible, computer-readable, and/or computer-executable storage media. Examples of memory 630 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is active, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
   transmitting, by a node of a network, a first configuration file to a plurality of active nodes of the network;
   receiving, by the node of the network, a vote from one or more of the plurality of active nodes of the network, wherein each vote is generated by an active node in response to the active node comparing the first configuration file received from the node of the network to a second configuration file received from a system administrator;
   determining, by the node of the network and based on each vote received from each active node, a percentage of the plurality of active nodes of the network that voted to approve the first configuration file; and
   determining, by the node of the network, whether to activate the node based on the percentage of the plurality of active nodes that voted to approve the first configuration file;
   wherein:
   each vote is a vote to approve or disapprove the first configuration file;
   a vote to approve the first configuration file is generated in response to determining, based on comparing the first configuration file received from the node to the second configuration file received from the system administrator, that a network controller created the node in accordance with the second configuration file; and
   a vote to disapprove the first configuration file is generated in response to determining, based on comparing the first configuration file received from the node to the second configuration file received from the system administrator, that the network controller did not create the node in accordance with the second configuration file.

2. The method of claim 1, further comprising determining, by the node of the network, to activate the node when the percentage of the plurality of active nodes of the network that voted to approve the first configuration file is greater than fifty percent.

3. The method of claim 1, further comprising determining, by the node of the network, to discard the node when the percentage of the plurality of active nodes of the network that voted to approve the first configuration file within a predetermined amount of time is less than or equal to fifty percent.

4. The method of claim 1, wherein:
   the network is a software-defined network;
   the node is a virtual machine; and
   the system administrator is an entity.

5. The method of claim 1, wherein:
   activating the node comprises transitioning the node from an inactive state to an active state; and
   the node is operable to perform more operations in the active state than in the inactive state.

6. The method of claim 1, wherein:
   the node is created by a network controller of the network; and
   the plurality of active nodes represents all of the active nodes of the network.

7. A system comprising one or more processors and a memory storing instructions that, when executed by the one or more processors, cause the one or more processors to perform operations comprising:
   receiving, by the node of the network, a vote from one or more of the plurality of active nodes of the network, wherein each vote is generated by an active node in response to the active node comparing the first configuration file received from the node of the network to a second configuration file received from a system administrator;
   determining, by the node of the network and based on each vote received from each active node, a percentage of the plurality of active nodes of the network that voted to approve the first configuration file; and determining, by the node of the network, whether to activate the node based on the percentage of the plurality of active nodes that voted to approve the first configuration file;

wherein:
   each vote is a vote to approve or disapprove the first configuration file;
   a vote to approve the first configuration file is generated in response to determining, based on comparing the first configuration file received from the node to the second configuration file received from the system administrator, that a network controller created the node in accordance with the second configuration file; and
   a vote to disapprove the first configuration file is generated in response to determining, based on comparing the first configuration file received from the node to the second configuration file received from the system administrator, that the network controller did not create the node in accordance with the second configuration file.

8. The system of claim 7, wherein the operations further comprise determining to activate the node when the percentage of the plurality of active nodes of the network that voted to approve the first configuration file is greater than fifty percent.

9. The system of claim 7, wherein the operations further comprise determining to discard the node when the percentage of the plurality of active nodes of the network that voted to approve the first configuration file within a predetermined amount of time is less than or equal to fifty percent.

10. The system of claim 7, wherein
   the network is a software-defined network;
   the node is a virtual machine; and
   the system administrator is an entity.

11. The system of claim 7, wherein:
   activating the node comprises transitioning the node from an inactive state to an active state; and
   the node is operable to perform more operations in the active state than in the inactive state.

12. The system of claim 7, wherein:
   the node is created by a network controller of the network; and
   the plurality of active nodes represents all of the active nodes of the network.

13. One or more computer-readable storage media embodying instructions that, when executed by a processor, cause the processor to perform operations comprising:
   receiving, by the node of the network, a vote from one or more of the plurality of active nodes of the network, wherein each vote is generated by an active node in response to the active node comparing the first configuration file received from the node of the network to a second configuration file received from a system administrator;
   determining, by the node of the network and based on each vote received from each active node, a percentage of the plurality of active nodes of the network that voted to approve the first configuration file; and
   determining, by the node of the network, whether to activate the node based on the percentage of the plurality of active nodes that voted to approve the first configuration file;

wherein:
   each vote is a vote to approve or disapprove the first configuration file;
   a vote to approve the first configuration file is generated in response to determining, based on comparing the first configuration file received from the node to the second configuration file received from the system administrator, that a network controller created the node in accordance with the second configuration file; and
   a vote to disapprove the first configuration file is generated in response to determining, based on comparing the first configuration file received from the node to the second configuration file received from the system administrator, that the network controller did not create the node in accordance with the second configuration file.

14. The one or more computer-readable storage media of claim 13, wherein the operations further comprise determining to activate the node when the percentage of the plurality of active nodes of the network that voted to approve the first configuration file is greater than fifty percent.

15. The one or more computer-readable storage media of claim 13, wherein the operations further comprise determining to discard the node when the percentage of the plurality of active nodes of the network that voted to approve the first configuration file within a predetermined amount of time is less than or equal to fifty percent.

16. The one or more computer-readable storage media of claim 13, wherein
   the network is a software-defined network;
   the node is a virtual machine; and
   the system administrator is an entity.

17. The one or more computer-readable storage media of claim 13, wherein:
   activating the node comprises transitioning the node from an inactive state to an active state; and
   the node is operable to perform more operations in the active state than in the inactive state.

* * * * *